United States Patent
Song

(10) Patent No.: US 9,676,281 B2
(45) Date of Patent: Jun. 13, 2017

(54) HYBRID BATTERY SYSTEM FOR ELECTRIC VEHICLES

(71) Applicant: JSYOUNGTECH CO., LTD., Gyeonggi-do (KR)

(72) Inventor: Yeong Kil Song, Seoul (KR)

(73) Assignee: JSYOUNGTECH CO., LTD., Anyang-si, Gyeonggi-do (KR)

( * ) Notice: Subject to any disclaimer, the term of this patent is extended or adjusted under 35 U.S.C. 154(b) by 566 days.

(21) Appl. No.: 14/352,998

(22) PCT Filed: Oct. 18, 2012

(86) PCT No.: PCT/KR2012/008529
§ 371 (c)(1),
(2) Date: Apr. 18, 2014

(87) PCT Pub. No.: WO2013/058568
PCT Pub. Date: Apr. 25, 2013

(65) Prior Publication Data
US 2014/0306519 A1    Oct. 16, 2014

(30) Foreign Application Priority Data
Oct. 18, 2011 (KR) .................... 10-2011-0106180

(51) Int. Cl.
*B60L 3/00* (2006.01)
*B60L 11/18* (2006.01)
(Continued)

(52) U.S. Cl.
CPC ......... *B60L 11/1809* (2013.01); *B60L 3/0046* (2013.01); *B60L 7/14* (2013.01);
(Continued)

(58) Field of Classification Search
CPC  B60L 3/0046; B60L 11/1809; B60L 11/1851; B60L 11/1855; B60L 11/1861;
(Continued)

(56) References Cited

U.S. PATENT DOCUMENTS 5,945,808 A * 8/1999 Kikuchi .................. B60K 6/46
320/132
6,094,031 A * 7/2000 Shimane ............. B60L 11/1855
320/118
(Continued)

FOREIGN PATENT DOCUMENTS

CN          1770586 A       5/2006
JP      2004-032871 A       1/2004
(Continued)

OTHER PUBLICATIONS

European Search Report dated Jan. 7, 2016.

*Primary Examiner* — Levi Gannon
(74) *Attorney, Agent, or Firm* — Rabin & Berdo, P.C.

(57) ABSTRACT

A hybrid battery system for an electric vehicle includes a lithium battery module including a plurality of lithium battery cells, a lead storage battery module including a plurality of lead storage battery cells, a first sensing unit including a sensor for measuring a temperature and a voltage of the lithium battery module, a second sensing unit including a sensor for measuring a temperature and a voltage of the lead storage battery module, a control circuit connected to the first sensing unit and the second sensing unit, the control circuit configured to measure a state of charge of each of the lithium battery module and the lead storage battery module by using the temperature and the voltage measured in the first sensing unit and the second sensing unit and to generate a control signal by comparing the temperature of the lithium battery module with a reference temperature and comparing the voltage of the lead storage battery module with a (Continued)

reference voltage, and a charging/discharging circuit connected to the lithium battery module and the lead storage battery module, the charging/discharging circuit including a switch for selectively discharging the lithium battery module or the lead storage battery module in response to the control signal.

4 Claims, 3 Drawing Sheets

(51) Int. Cl.
   *H02J 7/04* (2006.01)
   *H01M 10/44* (2006.01)
   *B60L 7/14* (2006.01)

(52) U.S. Cl.
   CPC ......... *B60L 11/1803* (2013.01); *B60L 11/185* (2013.01); *B60L 11/1816* (2013.01); *B60L 11/1855* (2013.01); *B60L 11/1861* (2013.01); *B60L 11/1866* (2013.01); *B60L 11/1868* (2013.01); *B60L 11/1874* (2013.01); *H01M 10/443* (2013.01); *H02J 7/04* (2013.01); *B60L 2210/10* (2013.01); *B60L 2240/12* (2013.01); *B60L 2240/545* (2013.01); *B60L 2240/547* (2013.01); *B60L 2250/16* (2013.01); *H01M 2220/20* (2013.01); *Y02T 10/7011* (2013.01); *Y02T 10/7016* (2013.01); *Y02T 10/7044* (2013.01); *Y02T 10/7061* (2013.01); *Y02T 10/7066* (2013.01); *Y02T 10/7072* (2013.01); *Y02T 10/7216* (2013.01); *Y02T 90/121* (2013.01); *Y02T 90/127* (2013.01); *Y02T 90/128* (2013.01); *Y02T 90/14* (2013.01)

(58) Field of Classification Search
   CPC .............. B60L 11/1862; B60L 11/1866; B60L 11/1868; B60L 2240/545; B60L 2240/547; H01M 10/44; H01M 10/441; H01M 10/443; H01M 2220/20; H02J 9/00; H02J 9/04; H02J 9/06; H02J 9/061; H02J 2009/068; Y02T 10/7005; Y02T 10/7011; Y02T 10/7016; Y02T 10/7044; Y02T 10/7061; Y02T 10/7066; Y02T 10/7072; Y02T 90/128
   USPC ........................................ 307/9.1, 10.1, 10.7
   See application file for complete search history.

(56) References Cited

U.S. PATENT DOCUMENTS

| 6,741,065 | B1* | 5/2004 | Ishii ................... B60L 11/1816 320/122 |
| 8,047,316 | B2* | 11/2011 | Takami .................. B60K 6/46 180/65.29 |
| 2006/0091857 | A1* | 5/2006 | Nakanishi ........... B60L 11/1851 320/116 |
| 2007/0069586 | A1 | 3/2007 | Queveau et al. |
| 2007/0219670 | A1* | 9/2007 | Tanaka ................ H01M 10/482 700/295 |
| 2011/0210859 | A1 | 9/2011 | Kim |
| 2013/0018548 | A1* | 1/2013 | Shimasaki ................ B60L 1/02 701/36 |

FOREIGN PATENT DOCUMENTS

| JP | 2010-093993 A | 4/2010 |
| KR | 10-2005-0070726 A | 7/2005 |
| KR | 10-2005-0070727 A | 7/2005 |
| KR | 10-2007-0103897 A | 10/2007 |
| KR | 10-2011-0065011 A | 6/2011 |
| KR | 10-2011-0077774 A | 7/2011 |
| KR | 10-2011-0081622 A | 7/2011 |

* cited by examiner

HYBRID BATTERY SYSTEM FOR ELECTRIC VEHICLES

TECHNICAL FIELD

This invention is for a battery system for electrical vehicles, and in particular, for a hybrid battery system for electric vehicles, in which lithium battery cells and lead storage battery cells are complementary and selected depending on the amount of electricity required in the vehicle.

BACKGROUND ART

Electric vehicles are motor-driven vehicles that are equipped with large capacity batteries. In the past, lead storage batteries were used, but these days a nickel hydride batteries and lithium batteries are predominantly used. It is expected that in the futures, lithium batteries will be primarily used.

Lead storage batteries had the advantage of being comparatively inexpensive and highly reliable in the past. However, they are being avoided for usage in electric vehicles because their output per unit is low, their volume is large, and the output voltage declines when used for long periods of time.

Compared to other batteries, lithium batteries are in the spotlight for being high-power and high-density batteries. However, lithium batteries are very expensive, their performance depends largely on temperature, and in particular, the electrolytes decompose at high temperatures, leading to sharply reduced battery lifespans. Moreover, lithium batteries suffer from the risk of ignition and explosion. In order to address these problems, Korean Patent Application Publication Nos. 2010-0001877, 2003-0100891 and 2003-0100893 present methods for cooling batteries.

Currently a lead storage battery of 10 kg can store approximately 1 kWh of electric energy, which can power an electric vehicle to drive 5~10 km. In order for an electric vehicle to travel 700 km it will require a 1 ton lead storage battery even if a high density lead storage battery is used. Hence a low density battery (i.e. lead storage battery) cannot be used as a secondary battery.

For electric vehicles used for short distance travel of about 100 km with a single charge, a high density battery is not required. Instead a cost efficient lead storage battery may be preferred since a complex cooling system is unnecessary as there is no risk for ignition or explosion. Since there is no risk of ignition and explosion the battery can be installed freely. However, with a long term use the lead storage battery's output voltage will drop and reach a level where it will be difficult to be used for driving. Also, for cases where high output power is needed (i.e. uphill driving or starting from stop) the lead storage battery would not be sufficient, as the output voltage is lower than a lithium battery.

SUMMARY OF THE INVENTION

Technical Problems

The objective of this invention is to provide an affordable and highly reliable battery system that could support an electric vehicle to travel approximately 100 km with a single charge.

Technical Solutions

According to the present invention, as a means for achieving the aforementioned object, a hybrid battery system for an electric vehicle is provided which includes: a lithium battery module including a plurality of lithium battery cells; a lead storage battery module including a plurality of lead storage battery cells; a first sensing unit including a sensor for measuring a temperature and a voltage of the lithium battery module; a second sensing unit including a sensor for measuring a temperature and a voltage of the lead storage battery module; a control circuit connected to the first sensing unit and the second sensing unit, the control circuit configured to measure a state of charge of each of the lithium battery module and the lead storage battery module by using the temperature and the voltage measured in the first sensing unit and the second sensing unit and to generate a control signal by comparing the temperature of the lithium battery module with a reference temperature and comparing the voltage of the lead storage battery module with a reference voltage; and a charging/discharging circuit connected to the lithium battery module and the lead storage battery module, the charging/discharging circuit including a switch for selectively discharging the lithium battery module or the lead storage battery module in response to the control signal. In the hybrid battery system for an electric vehicle, the lead storage battery module and the lithium battery module are selectively used. This makes it possible to prevent degradation of the hybrid battery system attributable to a decrease in the output voltage of the lead storage battery module and an increase in the temperature of the lithium battery module. The combined use of the affordable lead storage battery module helps reduce the manufacturing costs.

In the hybrid battery system for an electric vehicle, the control circuit is configured to generate a control signal for discharging the lead storage battery module, if the temperature of the lithium battery module is equal to or higher than the reference temperature and if the voltage of the lead storage battery module is equal to or higher than the reference voltage, and to generate a control signal for discharging the lithium battery module, if the temperature of the lithium battery module is lower than the reference temperature and if the voltage of the lead storage battery module is lower than the reference voltage.

In the hybrid battery system for an electric vehicle, the control circuit is connected to a motor control circuit for controlling a motor of the electric vehicle and is configured to generate a control signal for discharging the lithium battery module, if increased output power is required by the motor control circuit.

In the hybrid battery system for an electric vehicle, the control circuit is configured to issue a warning or stop an operation of the electric vehicle, if the temperature of the lithium battery module is equal to or higher than the reference temperature and if the voltage of the lead storage battery module is lower than the reference voltage.

In the hybrid battery system for an electric vehicle, the charging/discharging circuit further includes a uniform charging circuit and a uniform discharging circuit, both of which measure a voltage and a state of charge of each of the lithium battery cells and each of the lead storage battery cells during charging/discharging operations and discharge either of the lithium battery cells or the lead storage battery cells, whichever is higher in the voltage or the state of charge, thereby controlling the lithium battery cells and the lead storage battery cells such that the lithium battery cells and the lead storage battery cells are uniformly charged and discharged.

Advantageous Effects

In the hybrid battery system for an electric vehicle according to the present invention, the lead storage battery module and the lithium battery module are selectively used. This makes it possible to prevent degradation of the hybrid battery system attributable to a decrease in the output voltage of the lead storage battery module and an increase in the temperature of the lithium battery module. The combined use of the affordable lead storage battery module helps reduce the manufacturing costs.

Moreover, there is no need to install an additional cooling system which prevents the temperature of the lithium battery module from rising by continuous usage of the lithium battery module. This helps simplify the structure of the hybrid battery system. Since the lead storage battery module is quite stable, it is only necessary to install the lithium battery module in a safe position considerate the passenger's safety. Accordingly, the hybrid battery system can be easily installed in the electric vehicle.

MODE FOR CARRYING OUT THE INVENTION

Figure 1:
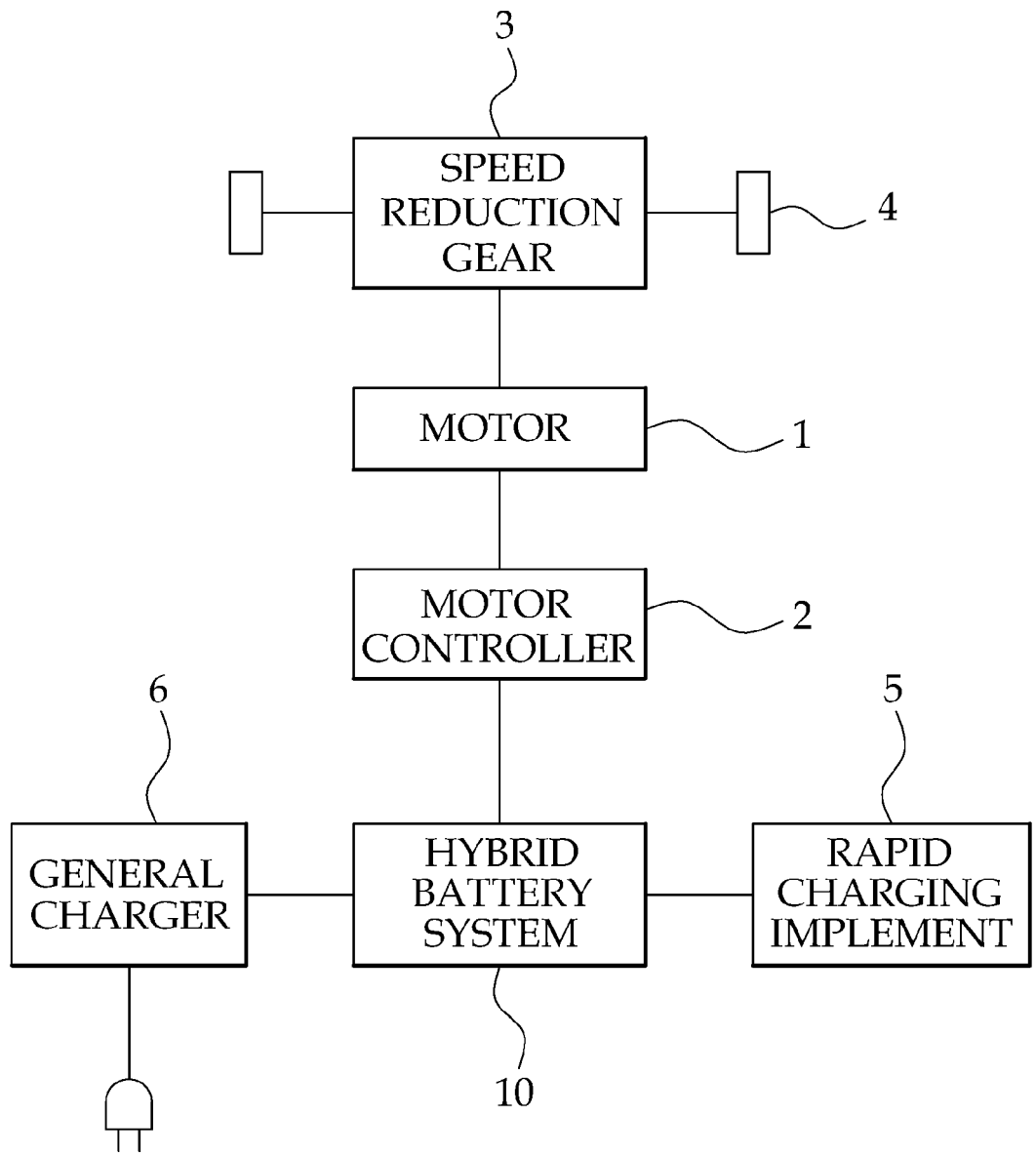
FIG. 1 is a configuration diagram of an electric vehicle system.

One embodiment of the present invention will now be described in detail with reference to the accompanying drawings.

The embodiment to be described below is presented by way of example in an effort to sufficiently transfer the concept of the present invention to those skilled in the relevant art. Therefore, the present invention is not limited to the following embodiment but may be embodied in many other forms. In the accompanying drawings, the width, length and thickness of the components may be illustrated on an exaggerated scale for the sake of convenience. Throughout the specification and the drawings, the same components will be designated by like reference numerals.

The hybrid battery system of the present invention can be applied not only to a general electric vehicle but also to a plug-in hybrid electric vehicle. The following description will be made by taking, as an example, a case where the present invention is applied to a general electric vehicle.

FIG. 1 is a configuration diagram of an electric vehicle system. Referring to FIG. 1, the electric vehicle includes a motor 1, a motor controller 2, a hybrid battery system 10 and a speed reduction gear 3.

The motor 1 of the electric vehicle is also referred to as a motor generator. This is because, when a brake is applied during the travel, a battery is charged by using the motor 1 as a generator. This operation is called a regenerative brake. The motor 1 is connected to wheels 4 via the speed reduction gear 3.

The motor controller 2 includes a motor control circuit and an inverter for converting a direct current to a three-phase alternating current in order to drive the motor 1 pursuant to the command of the motor control circuit. The inverter converts a direct current to an alternating current by way of turning a power transistor on and off.

The battery of the hybrid battery system 10 can be charged by a rapid charging implement 5 which is used in a rapid charging station just like a general gas station or by a general charger 6 which is capable of charging the battery through a typical power supply used in a household.

Figure 2:
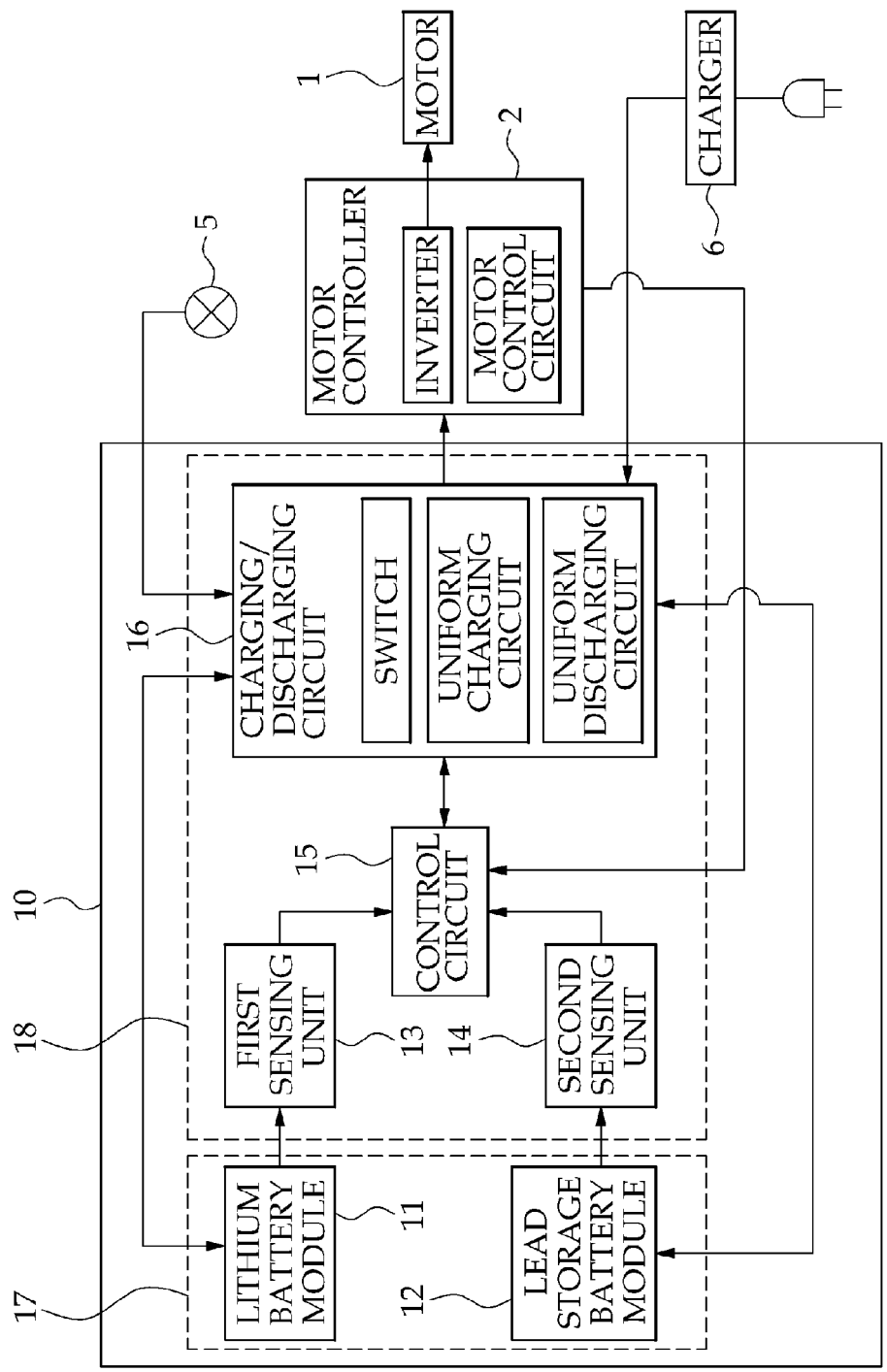
FIG. 2 is a block diagram of a hybrid battery system for an electric vehicle according to one embodiment of the present invention.

FIG. 2 is a block diagram of a hybrid battery system for an electric vehicle according to one embodiment of the present invention. Referring to FIG. 2, the hybrid battery system 10 includes a battery 17 which includes a lithium battery module 11 and a lead storage battery module 12, and a battery management system 18 which monitors a battery state and manages the battery so that the battery can be maintained and used under optimal conditions. The battery management system 18 includes a first sensing unit 13, a second sensing unit 14, a control circuit 15 and a charging/discharging circuit 16.

The lithium battery module 11 includes a plurality of lithium battery cells connected either in parallel or in series. The performance of a battery can be indicated by the magnitude of the collectable electric energy (having a unit of kWh) and the magnitude of the usable electric power (having a unit of kW). The lithium battery is superior in the collectable electric energy and the usable electric power to the lead storage battery. However, the properties of the lithium battery are degraded as the temperature thereof increases. The lithium battery suffers from a risk of explosion and the price of the lithium battery is very expensive.

The lead storage battery module 12 includes a plurality of lead storage battery cells connected either in parallel or in series. In case of the lead storage battery, the magnitude of the collectable electric energy is small and the magnitude of the usable electric power is also small. However, the lead storage battery has an advantage in that the price is affordable and the lead storage battery is stable and free from the risk of explosion. The lead storage battery module shows such a characteristic that the output voltage is reduced during long term use and is restored after a lapse of the prescribed time period. Since the magnitude of the usable electric power is small, the lead storage battery is hard to be used as a battery for an electric vehicle.

As set forth above, the lithium battery module 11 is degraded as the temperature thereof increases and, therefore, cannot be used for a long period of time without a cooling device. The lead storage battery module 12 cannot be used for a long period of time due to the reduction in the output voltage. The present invention solves these problems by selectively using the lithium battery module 11 and the lead storage battery module 12.

If a difference exists between the voltages of the lithium battery module 11 and the lead storage battery module 12, DC/DC converters (not shown) are installed in the lithium battery module 11 and the lead storage battery module 12, thereby increasing the voltage of the lithium battery module 11 or the lead storage battery module 12 to a voltage required by the motor 1.

Description will now be made on the battery management system 18. The battery management system 18 includes a first sensing unit 13, a second sensing unit 14, a control circuit 15 and a charging/discharging circuit 16.

The first sensing unit 13 is connected to the lithium battery cells of the lithium battery module 11 to measure the temperature and voltage of each of the lithium battery cells. The first sensing unit 13 is serially connected to the control circuit 15 through a communication line to deliver the information such as the temperature and voltage of each of the cells to the control circuit 15 by a serial communication method.

The second sensing unit 14 is connected to the lead storage battery cells of the lead storage battery module 12. The second sensing unit 14 measures the temperature and voltage of each of the lead storage battery cells and delivers the information such as the temperature and the voltage to the control circuit 15.

Based on the information delivered from the first sensing unit 13 and the second sensing unit 14, the control circuit 15 monitors and generally manages the states such as the temperature and the voltage of the lithium battery cells and the lead storage battery cells. The control circuit 15 measures the state of charge (SOC) according to a Coulomb count method, thereby determining the state of health (SOH). Moreover, the control circuit 15 estimates the electric power which can be outputted to an external circuit. The control circuit 15 compares the temperature of each of the lithium battery cells with a predetermined reference temperature to determine whether the lithium battery cells are in a safe state. The control circuit 15 compares the voltage of each of the lead storage battery cells with a predetermined reference voltage to determine whether the lead storage battery cells are in a usable state. In view of the states of charge of the lithium battery module 11 and the lead storage battery module 12 and in light of the temperature of the lithium battery module 11 and the voltage of the lead storage battery module 12, the control circuit 15 generates a control signal for selectively discharging one of the lithium battery module 11 and the lead storage battery module 12 and delivers the control signal to the charging/discharging circuit 16.

For example, if the lithium battery module 11 and the lead storage battery module 12 are sufficiently charged and if the lead storage battery module 12 is continuously used during a constant-speed travel, the voltage of the lead storage battery module 12 is gradually decreased due to the long time use of the lead storage battery module 12. If the voltage of the lead storage battery module 12 becomes lower than the reference voltage, the control circuit 15 generates a control signal for discharging the lithium battery module 11 and delivers the control signal to the charging/discharging circuit 16. If the voltage of the lead storage battery module 12 becomes higher than the reference voltage after a lapse of a specified time period, the control circuit 15 generates a control signal for selectively discharging one of the lithium battery module 11 and the lead storage battery module 12, in view of the states of charge of the lithium battery module 11 and the lead storage battery module 12. If the temperature of the lithium battery module 11 becomes equal to or higher than the reference temperature due to the continuous use of the lithium battery module 11, the control circuit 15 generates a control signal for discharging the lead storage battery module 12.

The control circuit 15 is connected to the motor control circuit of the motor controller 2 and, therefore, can check the travel state such as the restart after stoppage or the travel on a sloping road. If large output power is required depending on the travel state, the control circuit 15 generates a control signal for discharging the lithium battery module 11 and delivers the control signal to the charging/discharging circuit 16. This is because the usable electric power of the lead storage battery module 12 remains low even if the lead storage battery module 12 is sufficiently charged.

The charging/discharging circuit 16 includes a switch which selectively discharges the lithium battery module 11 and the lead storage battery module 12 in response to the control signal of the control circuit 15, a uniform discharging circuit which performs control such that the respective cells of the modules 11 and 12 are uniformly discharged during a discharging operation, and a uniform charging circuit which performs control such that the respective cells of the modules 11 and 12 are uniformly charged during a charging operation. In view of the voltage and the state of charge of the respective cells of the modules 11 and 12 during the discharging operation, the uniform discharging circuit assures uniform discharging by individually discharging the cells which are relatively high in the voltage and the state of charge. In view of the voltage and the state of charge of the respective cells of the modules 11 and 12 during the charging operation, the uniform charging circuit assures uniform charging by individually discharging the cells which are relatively high in the voltage and the state of charge. Alternatively, the uniform charging circuit may assure uniform charging by individually charging the cells which are relatively low in the voltage and the state of charge.

Figure 3:
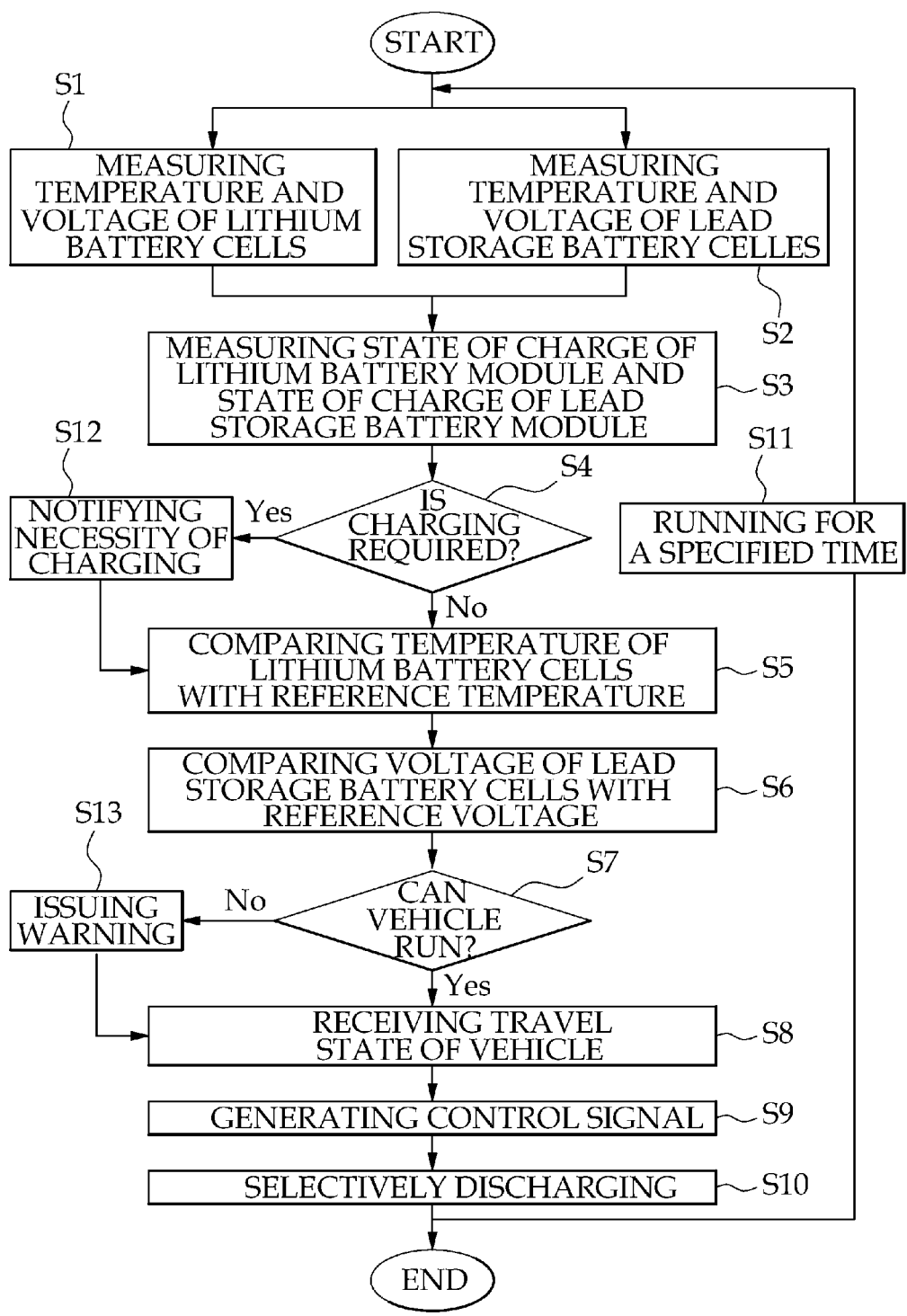
FIG. 3 is a flowchart illustrating the operation of the hybrid battery system for an electric vehicle according to one embodiment of the present invention.

The operation of the hybrid battery system for an electric vehicle will now be described with reference to FIG. 3.

If an electric vehicle begins to run, the first sensing unit 13 and the second sensing unit 14 measures the temperatures and voltages of the lithium battery cells and the lead storage battery cells (S1 and S2).

Then, the control circuit 15 measures the state of charge and the state of health of the lithium battery module 11 and the lead storage battery module 12 using the data measured in the first sensing unit 13 and the second sensing unit 14 (S3). Based on the measurement result of the state of charge, the control circuit 15 determines whether the electric vehicle can run (S4). If the measurement result reveals that the electric vehicle can run, the measured state of charge is delivered to a driver through a display installed near a driver's seat. If the lithium battery module 11 and the lead storage battery module 12 are low in the state of charge and are required to be charged, the necessity of charging is notified to the driver through the display installed near the driver's seat (S12).

Then, the control circuit 15 compares the temperature of each of the cells of the lithium battery module 11 measured in the first sensing unit 13 with a reference temperature (S5). Furthermore, the control circuit 15 compares the voltage of each of the cells of the lead storage battery module 12 measured in the second sensing unit 14 with a reference voltage (S6). If the comparison results indicate that the electric vehicle is difficult to run because the temperature of each of the cells of the lithium battery module 11 is equal to or higher than the reference temperature and because the voltage of each of the cells of the lead storage battery module 12 is lower than the reference voltage, a warning is issued to the driver through the display installed near the driver's seat, so that the driver can cope with the situation (S13). If necessary, the control circuit 15 may stop the operation of the electric vehicle.

Then, the control circuit 15 receives the information on the travel state of the electric vehicle via the motor control circuit of the motor controller 2 (S8). More specifically, the control circuit 15 receives the information on the travel state of the electric vehicle such as the constant speed travel of the electric vehicle, the restart of the electric vehicle after stoppage and the travel of the electric vehicle on a sloping road.

Steps S4 and S8 are performed by the control circuit 15 and may be performed at the same time or may be performed in an order differing from the aforementioned order.

Subsequently, based on the results obtained in steps S4 to S8, the control circuit 15 determines which of the lithium battery module 11 and the lead storage battery module 12 is to be used. The control circuit 15 generates a control signal for selectively discharging one of the lithium battery module 11 and the lead storage battery module 12 and delivers the control signal to the charging/discharging circuit 16 (S9).

Responsive to the control signal, the charging/discharging circuit 16 discharges one of the lithium battery module 11 and the lead storage battery module 12 (S10). At this time, in view of the voltage and the state of charge of each of the cells of the discharged module 11 or 12, the uniform discharging circuit makes sure that the cells relatively high in the voltage and the state of charge are preferentially discharged in an increased amount, thereby assuring uniform discharging.

If a specified time is elapsed (S11), steps S1 to S10 are repeatedly performed.

While a certain preferred embodiment of the invention has been shown and described above, the present invention is not limited to the aforementioned specific embodiment. It goes without saying that a person skilled in the relevant art can make various changes and modifications without departing from the scope of the invention defined in the claims. Such changes and modifications shall be construed to fall within the scope of the present invention.

| [Description of Reference symbols] | |
| --- | --- |
| 1: motor | 2: motor controller |
| 3: speed reduction gear | 10: hybrid battery system |
| 11: lithium battery module | 12: lead storage battery module |
| 13: first sensing unit | 14: second sensing unit |
| 15: control circuit | 16: charging/discharging circuit |

What is claimed is:

1. A hybrid battery system for an electric vehicle, comprising:
   a lithium battery module including a plurality of lithium battery cells;
   a lead storage battery module including a plurality of lead storage battery cells, the lead storage battery module being electrically isolated from the lithium battery module;
   a first sensing unit including a sensor for measuring a temperature and a voltage of the lithium battery module;
   a second sensing unit including a sensor for measuring a temperature and a voltage of the lead storage battery module;
   a control circuit connected to the first sensing unit and the second sensing unit, the control circuit configured to measure a state of charge of each of the lithium battery module and the lead storage battery module by using the temperature and the voltage measured in the first sensing unit and the second sensing unit and to generate a control signal by comparing the temperature of the lithium battery module with a reference temperature and comparing the voltage of the lead storage battery module with a reference voltage; and
   a charging/discharging circuit connected to the lithium battery module and the lead storage battery module, the charging/discharging circuit including a switch for selectively discharging the lithium battery module or the lead storage battery module in response to the control signal, wherein the switch connects a selected one of the lithium battery module and the lead storage battery module to an electrical load of the electric vehicle to supply electric power to the electric vehicle,
   wherein the control circuit is configured to generate a control signal for discharging the lead storage battery module, if the temperature of the lithium battery module is equal to or higher than the reference temperature and if the voltage of the lead storage battery module is equal to or higher than the reference voltage, and to generate a control signal for discharging the lithium battery module, if the temperature of the lithium battery module is lower than the reference temperature and if the voltage of the lead storage battery module is lower than the reference voltage.

2. The hybrid battery system for an electric vehicle as recited in claim 1, wherein the control circuit is connected to a motor control circuit for controlling a motor of the electric vehicle and is configured to generate a control signal for discharging the lithium battery module, if increased output power is required by the motor control circuit.

3. The hybrid battery system for an electric vehicle as recited in claim 1, wherein the control circuit is configured to issue a warning or stop an operation of the electric vehicle, if the temperature of the lithium battery module is equal to or higher than the reference temperature and if the voltage of the lead storage battery module is lower than the reference voltage.

4. The hybrid battery system for an electric vehicle as recited in claim 1, wherein the charging/discharging circuit further includes a uniform charging circuit and a uniform discharging circuit, both of which measure a voltage and a state of charge of each of the lithium battery cells and each of the lead storage battery cells during charging/discharging operations and discharge either of the lithium battery cells or the lead storage battery cells, whichever is higher in the voltage or the state of charge, thereby controlling the lithium battery cells and the lead storage battery cells such that the lithium battery cells and the lead storage battery cells are uniformly charged and discharged.

* * * * *